Patented Nov. 24, 1931

1,833,061

UNITED STATES PATENT OFFICE

JAN ARENT SCHØNHEYDER VAN DEURS, OF FREDERIKSBERG, NEAR COPENHAGEN, DENMARK

PROCESS FOR TREATING FATTY RAW MATERIALS

No Drawing. Application filed December 18, 1928, Serial No. 326,910, and in Denmark December 27, 1927.

The present invention relates to a process for treating fatty raw materials aiming partly to the recovery of fat or oil, partly to the preservation of the fats in the raw material possibly with the purpose of a later recovery of fat or oil. In nature the fats are found in the tissues of plants and animals. Only in scattered cases are they found in the shape of bodies of pure fat, as e. g. in cavities in the heads of certain sea-mammals and fishes. As a rule they are found as deposits in tissues consisting of carbohydrates and proteins in combination with water. Carbohydrates or proteins form with water and fat a colloidal system, from which the two liquid components, water and fat, cannot be separated without difficulty. Also in technical arts, mixtures of fats and other substances are often found, from which mixtures it is desirable to recover the fats. As examples may be mentioned fuller's earth which has been used for the cleaning of oils, and catalysts which have been employed in the hydrogenation of fats. In the customary processes for the recovery of fats from animal or vegetable raw materials and from the fat mixtures occurring in industry, pressing extraction, or a combination of both treatments is chiefly employed. In the pressing method especially and partly also by the extraction it is difficult to recover the fat quantitatively, as a portion thereof will always remain in the foreign substances, e. g. remainder of tissues, with which the fats are mixed. The present invention has for its subject a process for treating fatty raw materials, by which the raw material is subjected to an alteration of the hydrogen ion concentration, if wanted after a suitable pretreatment, e. g. grinding so that the hydrogen ion exponent (pH) within the substance surrounding the fats is reduced to a value at all events less than 5. By this alteration of the hydrogen ion concentration of the substance surrounding the fat the surface-tension of the components is altered, so that the fat has no longer any great tendency to moisten the solid parts of the raw material as has the aqueous part of the raw material, whereby it is possible to produce the fats without employing pressure or extraction. The said alteration of the hydrogen ion concentration of the substance surrounding the fat may be produced by adding acid to it either by direct addition or by the aid of micro-organisms and with or without the addition of salts. It may be obtained fully without addition of acid only by addition of salts having a suitably acid reaction. The alteration of the hydrogen ion concentration may be accompanied, if wanted, by a mechanical bursting of the cell walls, if this is necessary for the gaining of the fats or their preservation in the raw material. If the above described treatment of fatty raw materials aims to recover fat or oil, the raw material may also be subjected to a changing of temperature with the purpose of melting if necessary the fats or to alter their viscosity. Water may be added in order to facilitate the non-fats to form a joint phase. In this case the fats may be caused to form a joint phase by mechanical treatment of the so prepared material, e. g. by stirring, shaking or centrifugation, but without any cooking or heating beyond the temperature which is necessary to keep the fat liquid or to give it a suitable viscosity.

Example I

By addition of acid to ground fish-liver until the hydrogen ion exponent (pH) becomes 1,5 the fish-oil contained in the liver is separated out as an independent phase. By a supplementary centrifugation 99% of the fish-oil contained in the liver may be recovered.

Example II

By finely grinding copra with the addition of 25% of water and a supplementary addition of acid until the hydrogen ion exponent (pH) is about 2, and by heating until above 30° C. the cocofat is separated out and may be easily recovered by centrifugation.

Example III

By addition of water and acid to a mixture of fuller's earth and mineral oil until the hydrogen ion exponent (pH) is about 3, the mixture is separated up into a layer consisting of fuller's earth and water and another layer of oil.

Example IV

By addition of lactic acid bacteria (B. cremoris) to crushed olives on leaving this to stand at about 25° C. the lactic acid formed alters its hydrogen ion concentration so that the oil and the remainder are easily separated by centrifugation.

Experiments have shown that an excellent preservation of the fats contained in the raw material is obtained by the above process, whereby the hydrogen ion concentration in the substance surrounding the fats is so altered by acidulating either by direct addition or by the aid of micro-organisms with or without the addition of salts that the hydrogen ion exponent (pH) assumes a value at all events less than 5. It is known to preserve substances comprising carbohydrates and in part proteins also by acidulating them in various ways. By the acidulation, which may also be effected by a fermentation, the substances to be preserved are generally altered. So carbohydrates are more or less hydrolized, while the amino groups of the proteids are bound by the acid. According to this invention, however, nothing is altered in the actual substance, which it is desired to preserve, viz the fats, but this substance is surrounded with another substance protecting it against deterioration. As above stated such alterations take place in the surface-tension of the fats and their surrounding substances, when the hydrogen ion concentration is altered according to this invention, that the fats are very easily separated under suitable circumstances. When the fatty raw material (which may be pre-treated in a suitable manner—e. g. by grinding—in the same manner as when recovering the fats is the direct purpose) is subjected to the above stated alteration of the hydrogen ion concentration, a direct separation of a greater or less quantity of the fats may take place. According to the invention this mass of fats may either be kept together with the raw material or separated therefrom. In order to obtain the preservation it is only necessary to keep or to transport the material in the state obtained by the alteration of the hydrogen ion concentration. By way of example it may be mentioned that the oil contained in fish-liver (e. g. cod-livers), fishes (e. g. herrings), fruits (e. g., palm-fruit) seed (e. g. copra) when the hydrogen ion exponents are below 5 is not altered even after a long time of keeping, neither by decomposition of the fats e. g. on an enzymatic way nor by oxidation, colouration or taking up of substances from the accompanying tissues, which is a contrast to what is the case with untreated materials. The oil or fat produced in the above manner are distinguished beyond the products produced by extraction especially from residues of the extractive agent, which are only removed with difficulty, and freedom from non-fats probably colored soluble in the extractive agent and introduced into the fats by the extractive process, and they are superior to the fats recovered by pressing inasmuch as they are not in colloidal mixture with great quantities of the proteins and tissues of the raw material, from which it is difficult to separate them later on. The resulting oil or fat has, therefore essential advantages above that recovered by the customary processes for recovering oils or fats, and the invention comprises, therefore, also the oil or fats recovered by the present process. When the process is employed for the separation of fats from natural raw materials, the non-fatty parts thereof occur in a form different from that wherein they occur when the oil is recovered by pressing or extraction. Thus they do not contain (as do extractive residues) traces of an extractive agent or (as do press cakes) comparatively large quantities of fats. The non-fatty parts of the raw material, which may be employed as feedstuffs or as a fertilizer or in another way, after a suitable finishing treatment, if required, are, therefore, also comprised within the said invention.

I claim

1. A process for the production of fat or oil from such raw materials where the fat or oil occurs in a natural manner in vegetable or animal tissues, comprising the steps of preparing the raw material for acidulation, acidulating raw material until the hydrogen ion exponent in the substance surrounding the fat has a value between 5 and 1, leaving the raw material to stand without deliberately altering the hydrogen ion exponent at a temperature at which the fat is liquid and has a suitable viscosity and without cooking, until a quantity of fat or oil gathers and forms a continuous phase without the employment of pressing, and separating the recovered fat or oil from the remainder of the raw material in a known manner.

2. A process for the production of fat or oil from such raw materials where the fat or oil occurs in a natural manner in vegetable or animal tissues, comprising the combination of the following working steps: preparation of the raw material for acidulation, acidulation of the raw material until the hydrogen ion exponent in the substance surrounding the fat has a value between 5 and 1, agitation of the acidulated raw material at a temperature at which the fat is liquid and has a suitable viscosity, until a quantity of fat or oil gathers without employment of pressing or cooking and forms a continuous phase, and separation in a known manner of the thus recovered fat or oil from the remainder of the raw material.

3. A process for the production of fat or oil from such raw materials where the fat or oil occurs in a natural manner in vegetable or animal tissues, comprising the combination of the following working steps: preparation of the raw material for acidulation, acidulation of the raw material until the hydrogen ion exponent in the substance surrounding the fat has a value between 5 and 1, accelerated agitation of the acidulated raw material at a temperature at which the fat is liquid and has a suitable viscosity until a quantity of fat has gathered and formed a continuous phase and separation of the recovered fat or oil from the remainder of the raw material.

4. A process according to claim 3 characterized in that the accelerated agitation consists in a shaking.

5. A process according to claim 3 characterized in that the accelerated agitation is a treatment in a centrifuge.

6. A process for the preservation of fat or oil in such raw materials where the fats or oil occur in a natural manner in vegetable or animal tissues, comprising the combination of the following working steps: preparation of the raw material for acidulation, acidulation of the raw material until the hydrogen ion exponent in the substance surrounding the fat has a value between 5 and 1, and standing of the thus acidulated raw material without spontaneous alteration of the hydrogen ion exponent until the fat is to be recovered therefrom.

7. A process according to claim 1 characterized in that the acidulation is performed by addition of an agent of which an aqueous solution gives an acid reaction, in such quantities that the hydrogen ion exponent in the substance surrounding the fat in the raw material assumes a value between 5 and 1.

8. A process according to claim 1 characterized in that the acidulation is brought about by the action of acidulating microorganisms.

9. A process according to claim 1 characterized in that the acidulation is brought about by addition of an agent, of which an aqueous solution gives an acid reaction, in such quantities that the hydrogen ion exponent in the substance surrounding the fat in the raw material assumes a value between 5 and 1.

10. A process according to claim 2 characterized in that the acidulation is brought about by the action of acidulating microorganisms.

11. A process according to claim 3 characterized in that the acidulation is brought about by addition of an agent, of which an aqueous solution gives an acid reaction, in such quantities that the hydrogen ion exponent in the substance surrounding the fat in the raw material assumes a value between 5 and 1.

12. A process according to claim 3 characterized in that the acidulation is brought about by the action of acidulating microorganisms.

13. A process according to claim 6 characterized in that the acidulation is brought about by addition of an agent, of which an aqeous solution gives an acid reaction, in such quantities that the hydrogen ion exponent in the substance surrounding the fat in the raw material assumes a value between 5 and 1.

14. A process according to claim 6 characterized in that the acidulation is brought about by the action of acidulating microorganisms.

15. A process for the preservation of fat or oil from such raw materials where the fat or oil occurs in a natural manner in vegetable or animal tissues, comprising the preparation of the raw material for acidulation, acidulation of the raw material until the hydrogen ion exponent in the substance surrounding the fat has a value between 5 and 1, and preservation during standing or transport of the raw material in that state of acidity into which it has come by the acidulation.

In testimony whereof I affix my signature.

JAN ARENT SCHØNHEYDER van DEURS.